United States Patent [19]

Cuvillier

[11] 4,456,428
[45] Jun. 26, 1984

[54] APPARATUS FOR COOLING TURBINE BLADES

[75] Inventor: Michel L. Cuvillier, Chatellerault, France

[73] Assignee: S.N.E.C.M.A., Paris, France

[21] Appl. No.: 483,443

[22] Filed: Apr. 14, 1983

Related U.S. Application Data

[63] Continuation of Ser. No. 201,374, Oct. 27, 1980, abandoned.

[30] Foreign Application Priority Data

Oct. 26, 1979 [FR] France ................ 79 26665

[51] Int. Cl.³ .................................. F01D 5/18
[52] U.S. Cl. ......................... 416/97 R; 416/96 R; 415/115
[58] Field of Search ............. 416/96 R, 97 R; 415/115

[56] References Cited

U.S. PATENT DOCUMENTS

| 3,045,965 | 7/1962 | Bowmer .................... 416/97 X |
| 3,094,310 | 6/1963 | Bowmer .................... 416/96 |
| 3,191,908 | 6/1965 | Powell et al. .............. 416/96 |
| 3,369,792 | 2/1968 | Kraimer et al. ............ 416/97 X |
| 3,540,810 | 11/1970 | Kercher .................... 416/97 X |
| 3,626,568 | 12/1971 | Silverstein et al. .......... 416/96 |
| 3,782,852 | 1/1974 | Moore ...................... 416/97 |
| 3,825,984 | 7/1974 | Linko et al. ................ 416/97 |
| 3,836,283 | 9/1974 | Matsuki et al. ............. 416/96 |
| 3,853,425 | 12/1974 | Scalzo et al. ............... 416/96 |
| 4,118,145 | 10/1978 | Stahl ....................... 416/97 R |
| 4,136,516 | 1/1979 | Corsmeier ................. 416/97 R |
| 4,180,373 | 12/1979 | Moore et al. ............... 415/115 X |
| 4,257,737 | 3/1981 | Andress et al. ............. 415/115 X |
| 4,312,624 | 1/1982 | Steinbauer, Jr. et al. ...... 415/115 |

FOREIGN PATENT DOCUMENTS

| 1144955 | 10/1957 | France . |
| 1227773 | 8/1960 | France . |
| 2144735 | 2/1973 | France . |
| 2174497 | 12/1973 | France . |
| 2323007 | 1/1977 | France . |
| 1188382 | 4/1970 | United Kingdom . |

Primary Examiner—Stephen Marcus
Assistant Examiner—John Kwon
Attorney, Agent, or Firm—Oblon, Fisher, Spivak, McClelland & Maier

[57] ABSTRACT

An apparatus for cooling turbine blades, especially of fluid outflow machines and including at least two cavities separated by a partition extending obliquely in the median, radial plane of the blade, the cavities with their partition walls being connected by acceleration link members for thermal exchange and the outflow and driving edges including fluid discharge openings formed therein. Each blade includes a fluid discharge opening located under the platform of the blade on the outflow edge side, through which most of the cooling air is discharged in the area of selected counter-pressure.

8 Claims, 8 Drawing Figures

APPARATUS FOR COOLING TURBINE BLADES

This application is a continuation of application Ser. No. 201,374, filed Oct. 27, 1980, abandoned.

BACKGROUND OF THE INVENTION

1. Field of the Invention

This invention concerns an apparatus for cooling turbine blades, particularly turbine blades capable of functioning at a high temperature.

2. Description of the Prior Art

Cooling the blades by way of providing a structure having air circulation channels is a well-known method in which air intake takes place at the base and the discharge takes place through the tip of the blade and by way of the leading and trailing edges. Yet, it has been realized that air flow through the tip of the blade (about 80% in traditional systems) is very sensitive to clearance variations at tip end of the blades, or between the blade and the turbine ring, at least with respect to blades with low blade height. Indeed, the clearance varies considerably in transitory speed according to the models and during the life of the engine.

Therefore, the counter-pressure at the tip of the blades is not at all well-known, and it considerably affects the cooling air flow, and thus the temperature of the blade, hence resulting in concern over leading most of the air flow into an area where the counter-pressure is known, weak and constant. However, the present invention has established that an area with these characteristics exists under the blade platform on the trailing edge side.

SUMMARY OF THE INVENTION

According to this invention, we use a perfected blade, especially a cooled blade from a fluid outflow machine which includes an envelope having at least two cavities separated by a partition that extends obliquely in the median radial plane of the blade, the cavities having their walls connected by acceleration link members for accelerating thermal exchange and the trailing and leading edges with fluid discharge openings, characterized in that each blade includes a fluid discharge opening located under the blade platform on the trailing edge side through which most of the cooling air leads into an area of selected counter-pressure. The blade perfected according to the invention makes possible the evacuation of most of the cooling air flow (about 55%) through the opening under the blade platform on the trailing edge side.

Furthermore, the perfected blade can be fed by a low pressure air source and enables the use of a small or non-existent clearance at the tip of the blade. Finally, it allows for functioning at a high temperature with a correct cooling flow.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
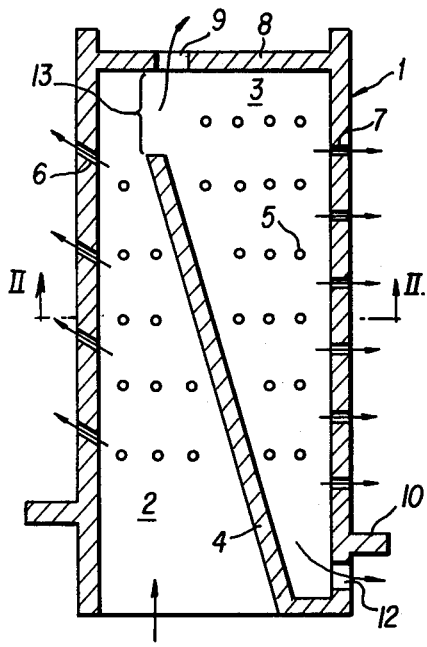
FIG. 1 depicts a longitudinal sectional view of an embodiment for a two-cavity blade.
Figure 2:
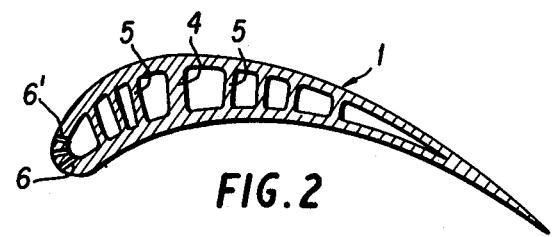
FIG. 2 depicts a cross-sectional view along line II—II of FIG. 1.

In FIGS. 1 and 2, a first embodiment for a cooled turbine blade 1 is shown an envelope which includes the interior space of which is divided into two cavities 2 and 3 by a partition 4 extending obliquely in the median radial plane of the blade. The partition 4 is interrupted at its upper part in such a way as to leave a passage 13 between the two cavities 2 and 3. A plurality of link members 5 connect the concave face to the convex face of the blade and ensure acceleration of thermal exchange.

Figure 4:
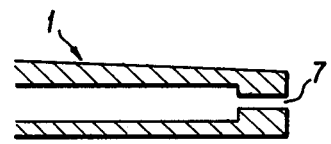
FIG. 4 depicts a sectional view of the trailing edge of the blade with an opening along the axle.
Figure 3:
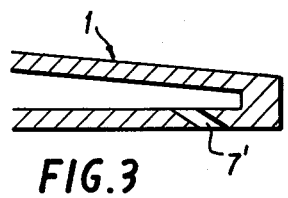
FIG. 3 depicts a sectional view of the trailing edge of the blade with an opening on the concave face.

Fluid discharge openings 6 are provided in the leading edge of the blade and make possible the cooling of the leading edge and lead either directly to the leading edge 6 or on the convex face 6'. Furthermore, fluid discharge openings 7 are also planned in the outflow edge which are arranged in the axis of the blade trailing edge, as is shown in FIG. 4. In the embodiment depicted in FIG. 3, the openings 7' are arranged on the concave face of the trailing edge of the blade. On its upper side, the blade 1 includes a cap 8 into which an opening 9 is drilled also permitting the fluid to escape.

Figure 6:
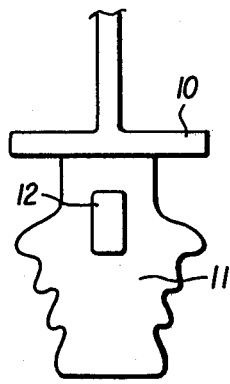
FIG. 6 depicts a view of the back side of the lower part of the blade located on the trailing edge side.

On its lower side, the blade 1 is equipped with a platform 10 (FIGS. 1 and 6) under which is positioned a blade root 11 ensuring attachment inside a support disc (not shown). The cavity 3 is linked to the exterior by an opening 12 located under the platform 10 of the blade and exclusively on the trailing edge side. Opening 12 leads into an area of selected counter pressure and ensures the outflow of most of the air flux (about 55%) escaping from the blade towards the outside.

Figure 5:
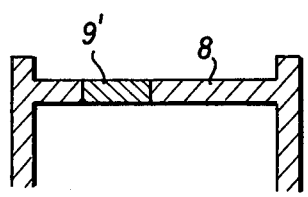
FIG. 5 is a longitudinal sectional view of the upper part of the blade, the opening of which is blocked.

In a variation of the embodiment depicted in FIG. 5, the cap 8 of the blade is covered by a stellite drop or a small soldered plate 9'. In this case, the flows can be apportioned as follows: 25% through the leading edge; 20% through the trailing edge and 55% through the opening 12 of the root of the blade.

Figure 7:
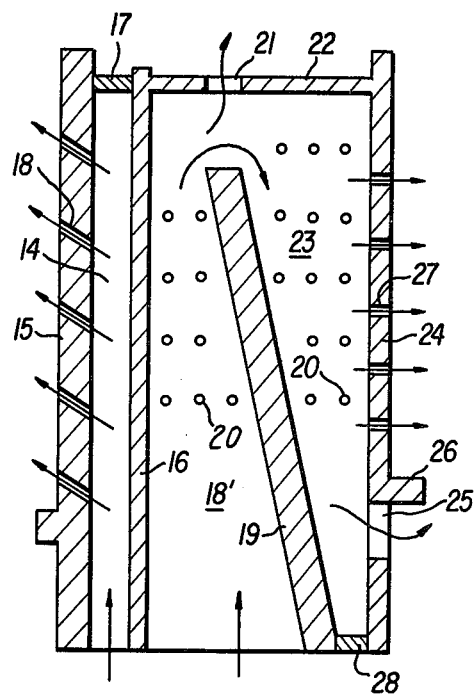
FIG. 7 depicts a longitudinal section view of another embodiment for a three-cavity blade.

In FIG. 7, a variation of the embodiment of the blade according to the invention in which three cavities are planned is shown. One upstream cavity 14 is defined by the leading edge 15 and a radial internal partition 16. This cavity 14, covered on its upper side by a stellite drop or welded plate 17, is crossed by a centrifugal air flow that escapes through the openings 18 drilled in the leading edge 15. A central cavity 18' is defined by the partition 16 and by an oblique partition 19 and includes link members 20 similar to those depicted in FIGS. 1 and 2.

This central cavity 18'; is crossed by a centrifugal air flow which immediately splits into two currents one of which escapes through opening 21 drilled in the cap 22 of the blade or from the foundry and the other of which flows in a centripetal direction towards a third downstream cavity 23. This downstream cavity 23 is defined by the oblique partition 19 and by the trailing edge 24. Like cavity 18', it includes a plurality of link members 20 that accelerate the heat exchange. Cavity 23 is crossed by a centripetal air flow which escapes in large part through an opening 25 drilled in the root of the blade under the platform 26 of the blade and, ultimately, through the holes 27 of the trailing edge 24. The opening 25 is in principle identical to the opening 12 described in FIGS. 1 and 6. The cavity 23 is closed at the level of the root by a soldered drop 28.

Figure 8:
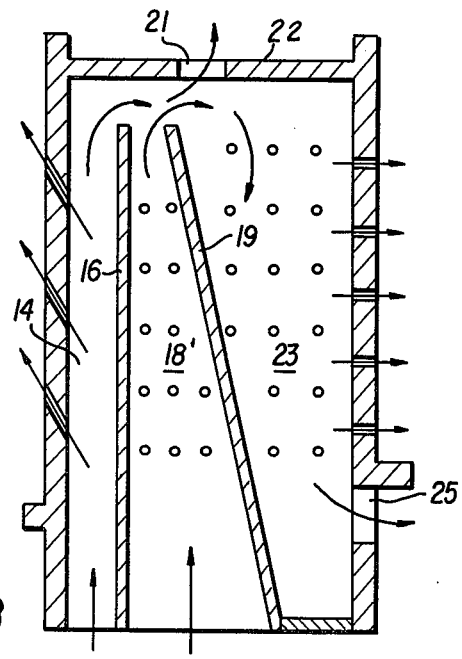
FIG. 8 depicts a longitudinal sectional view of a variant of the blade design depicted in FIG. 7.

In FIG. 8, a variation of the embodiment in FIG. 7 is shown in which the partition 16 that defines the cavity 14 is interrupted before the cap 22, so as to permit communication between cavities 14 and 18'. Because of the large amount of air flow which can be evacuated through the openings 12 or 25 (about 55%), it is possible in certain cases to eliminate the openings drilled in the trailing edge, in particular for combustion chamber exit temperatures of 1230° C. and below. This arrangement permits trailing edges to be implemented with low thickness.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for cooling a turbine blade with air, comprising:
    an envelope;
    partition means positioned within said envelope in a median, radial plane portion thereof so as to form at least a first and second cavity separated by said partition means;
    a plurality of link members positioned in each of said first and second cavities for thermal exchange, said blade further comprising a platform portion and trailing and leading edges with fluid discharge opening means located in said leading edge and said trailing edge and fluid discharge opening means formed in said blade under said platform portion of the blade exclusively on the trailing edge side for discharging most of the air which has been cooled into an area of selected counter-pressure; and
    a cap located at one end portion of said blade wherein said partition means further comprises at least one partition extending obliquely in the median radial plane of the blade and wherein an end portion of said oblique partition and said cap form first passage means therebetween so as to allow for the air to flow from said first cavity to said second cavity.

2. An apparatus according to claim 1, wherein said cap has a closable fluid escape opening formed therein.

3. An apparatus according to claim 1, wherein the trailing edge fluid discharge opening means is arranged on the axis of the trailing edge of said blade.

4. An apparatus according to claim 1, wherein the trailing edge fluid discharge opening means is arranged on a concave face portion of the trailing edge of said blade.

5. An apparatus according to claim 1, wherein the leading edge fluid discharge opening means leads directly to the leading edge of said blade and to a convex face portion of the leading edge.

6. An apparatus according to claim 1, wherein said partition means further comprises a radial partition such that said at least first and second cavity further comprises at least an upstream cavity defined by the leading edge and said radial partition, a central cavity defined by the radial partition and the oblique partition, and a downstream cavity defined by the oblique partition and the trailing edge.

7. An apparatus according to claim 6, wherein the blade further comprises a cap and further comprising second passage means formed between an end portion of the radial partition and said cap for linking the upstream cavity with the central and downstream cavities.

8. An apparatus according to claim 6, wherein the radial partition is in contact with the cap so that the upstream and center cavities are isolated, the cap having a closable opening formed thereon on a top part thereof.

* * * * *